(12) United States Patent
Lewis et al.

(10) Patent No.: US 10,547,675 B1
(45) Date of Patent: Jan. 28, 2020

(54) SYSTEMS AND METHODS FOR ONLINE CONTENT SHARING

(71) Applicant: Google Inc., Mountain View, CA (US)

(72) Inventors: Justin Lewis, Marina Del Rey, CA (US); Ruxandra Georgiana Paun, Santa Monica, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 15/842,760

(22) Filed: Dec. 14, 2017

Related U.S. Application Data (63) Continuation of application No. 13/910,739, filed on Jun. 5, 2013, now Pat. No. 9,866,628.

(51) Int. Cl.
*H04L 29/08* (2006.01)

(52) U.S. Cl.
CPC .................. *H04L 67/104* (2013.01)

(58) Field of Classification Search
None
See application file for complete search history.

(56) References Cited

U.S. PATENT DOCUMENTS

| | | | |
|---|---|---|---|
| 7,660,262 B2 | 2/2010 | Kato et al. | |
| 8,447,801 B1 * | 5/2013 | Roche | G06F 16/1834 709/201 |
| 2002/0095589 A1 | 7/2002 | Keech | |
| 2002/0107808 A1 | 8/2002 | Dobbelaar | |
| 2006/0224729 A1 | 10/2006 | Norman et al. | |
| 2007/0260605 A1 | 10/2007 | Norman et al. | |
| 2009/0049556 A1 | 2/2009 | Vrielink et al. | |
| 2009/0144392 A1 * | 6/2009 | Wang | G06Q 10/10 709/217 |
| 2009/0282052 A1 | 11/2009 | Evans et al. | |
| 2012/0109728 A1 * | 5/2012 | Sparks | G06Q 30/0214 705/14.16 |

OTHER PUBLICATIONS

Click Tracking: http://support.addthis.com/customer/portal/articles/381252-click-tracking, 2 pages.
Apsalar Support Center Referral Tracking Tag Generation: support.apsalar.com/customer/portal/articles/776566- referral-tag-generation, 6 pages.
Apsalar Support Center Referral Tracking Tags: support.apsalar.com/customer/portal/articles/797765-referral-tracking-tags.

* cited by examiner

*Primary Examiner* — Esther B. Henderson
(74) *Attorney, Agent, or Firm* — Lowenstein Sandler LLP (57) ABSTRACT

Methods, systems, and computer program products for online content sharing are provided. A computer-implemented method may include receiving an identifier of a video hosted by a content hosting platform from an external platform, the video being requested by a first user of the external platform, the first user having a first user account with the external platform. The method may also include determining that the video identifier comprises an attribution tag, and determining that the video was previously shared with the first user by a second user via the content hosting platform by analyzing the attribution tag, the second user having a second user account with the content hosting platform. The method may further include storing a record of the second user's sharing of the video with the first user in a data store of the content hosting platform.

23 Claims, 5 Drawing Sheets

SYSTEMS AND METHODS FOR ONLINE CONTENT SHARING

CROSS-REFERENCE TO RELATED APPLICATIONS

This application is a continuation application of co-pending U.S. patent application Ser. No. 13/910,739, filed on Jun. 5, 2013, entitled, "SYSTEMS AND METHODS FOR ONLINE CONTENT SHARING," which is herein incorporated by reference.

TECHNICAL FIELD

The field generally relates to content sharing and, more particularly, to the sharing of online content between users.

BACKGROUND

Websites, social networking services, content sharing platforms and other applications allow users to upload, view, and share digital content online. Digital content may include audio clips, movie clips, TV clips, and music videos. Digital content also may include amateur content such as text or video blogging, short original videos, pictures, photos, other multimedia content, etc. Users may use computing devices (e.g., smart phones, cellular phones, laptop computers, desktop computers, netbooks, tablet computers, video game consoles, etc.) to use, play, and/or consume media items (e.g., watch digital videos, and/or listen to digital music).

Content referral between users may be managed on a single platform, such as an online content sharing website, where each user has a platform account, provides content referrals using the platform, and accesses content on the platform using a respective platform account. In addition, users often recommend and access content using various external, non-related platforms and technologies, such as e-mail messages, text messages, instant messages, web pages, applications, social media websites, social media feeds, content sharing services, etc.

SUMMARY

Embodiments generally relate to the sharing and referral of online content. In one embodiment, a processor receives a request for content comprising an attribution tag associating a first user with the content where the request is received to provide the content to a second user. The processor determines that the first user referred the content to the second user by analyzing the attribution tag in the request. The processor also stores a record of the first user's referring of the content to the second user.

In another embodiment, a system including a memory and a processing device coupled with the memory is configured to receive a request for content comprising an attribution tag associating a first user with the content where the request is received to provide the content to a second user. The system is also configured to determine that the first user referred the content to the second user by analyzing the attribution tag in the request. The system also stores a record of the first user's referring of the content to the second user.

In a further embodiment, a computer-readable medium has instructions stored thereon that when executed by a processor, cause the processor to perform operations. The instructions include computer-readable program code configured to cause the processor to receive a request for content comprising an attribution tag associating a first user with the content where the request is received to provide the content to a second user, determine that the first user referred the content to the second user by analyzing the attribution tag in the request, and store a record of the first user's referring of the content to the second user.

Further embodiments, features, and advantages of the disclosure, as well as the structure and operation of the various embodiments of the disclosure are described in detail below with reference to accompanying drawings.

BRIEF DESCRIPTION OF THE DRAWINGS

Various embodiments of the present disclosure will be understood more fully from the detailed description given below and from the accompanying drawings of various embodiments of the disclosure. In the drawings, like reference numbers may indicate identical or functionally similar elements. The drawing in which an element first appears is generally indicated by the left-most digit in the corresponding reference number.

DETAILED DESCRIPTION

Millions of users share and view content online each day. While it is possible to manage content referrals on a single platform, many users choose to share content using various unrelated platforms and technologies. As a result, users providing content referrals outside of a single platform are not able to receive credit for such referrals.

Systems, methods, and computer program products for online content referral management are provided. Embodiments of the present disclosure allow users who have referred content on a system external to a content source to receive credit for such referrals.

A content referral system may receive a request to generate an attribution tag associating a user with content that the user wishes to share with others. The attribution tag may be included in a link distributed to one or more systems external to the content source. The external systems may use the link to provide other users with access to the content. A request comprising the attribute tag may be received from another user seeking to access the content. The attribute tag may be analyzed to determine that the content was referred. A record of the referral may be stored to allow the referring user to receive credit for their referral.

Accordingly, aspects of the present disclosure allow content referrals to be managed across different, non-related systems. Further, the authenticity of referrals may be verified, and users can receive credit for referrals provided across various systems.

Figure 1:
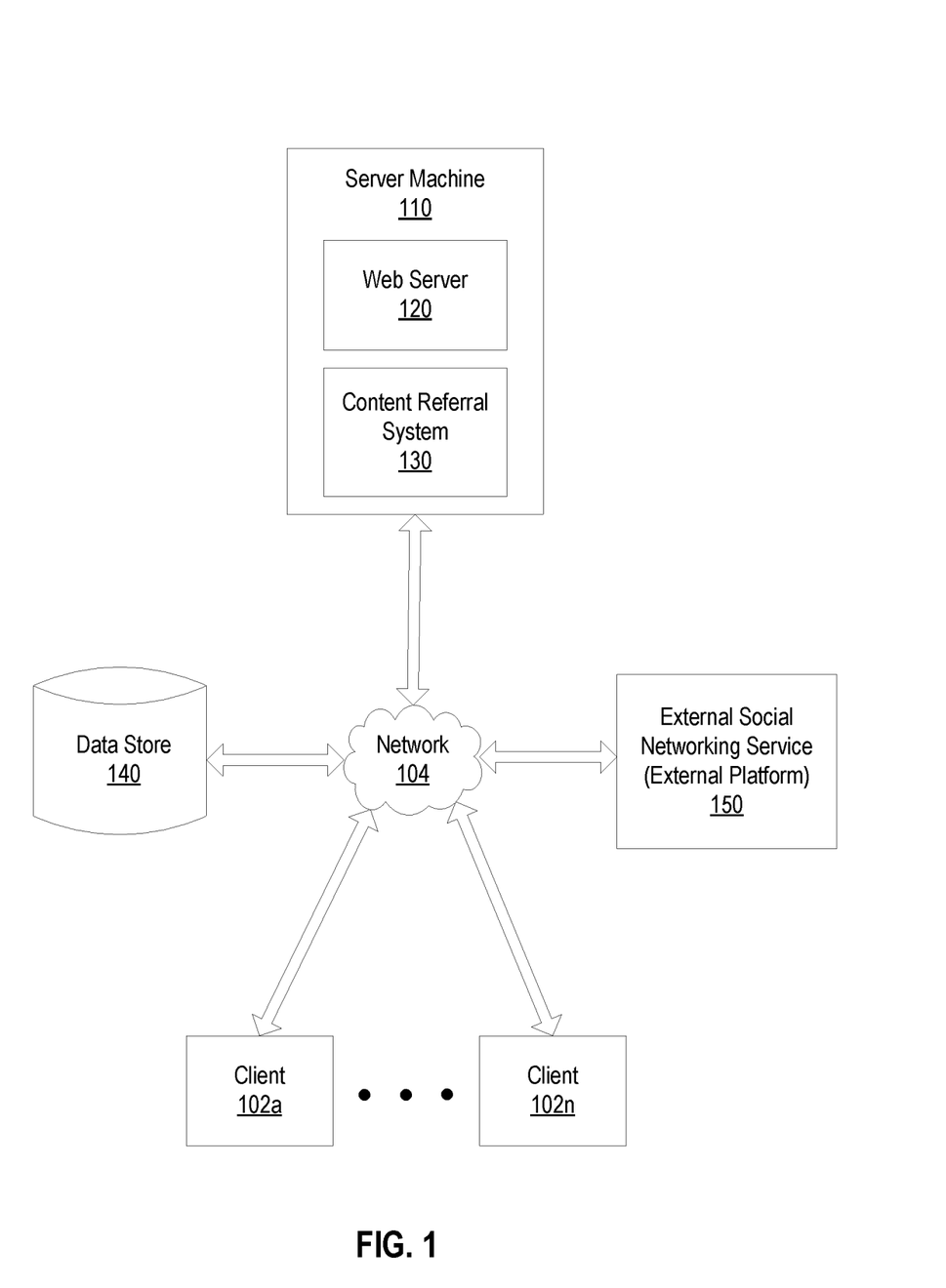
FIG. 1 illustrates an exemplary system architecture, in accordance with various embodiments of the present disclosure.

FIG. 1 illustrates exemplary system architecture 100 in which embodiments can be implemented. The system architecture 100 includes server machine 110, a data store 140 and client machines 102A-102N connected to a network 104. Network 104 may be a public network (e.g., the Internet), a private network (e.g., a local area network (LAN) or wide area network (WAN)), or a combination thereof.

Data store 140 is persistent storage that is capable of storing various types of data, such as text, audio, video and image content. In some embodiments data store 140 might be a network-attached file server, while in other embodiments data store 140 might be some other type of persistent storage such as an object-oriented database, a relational database, and so forth.

In one example, data store is associated with a content hosting service. A content hosting service may include systems, software applications and/or websites that allow users to store, publish, distribute, and/or access various forms of content. A content hosting service may include, but is not limited to, blogging services, file sharing services, image sharing services, video sharing services, document sharing services, broadcasting services, cloud storage, etc.

Data store 140 may include user generated content (e.g., user generated posts, audio, videos, images, etc.) uploaded by client machines 102A-102N. The data may additionally or alternatively include content provided by one or more other parties (e.g., advertisers, broadcasters, news providers, content publishers, etc.). Text, audio, video and image content may be added to the data store 140 as discrete files (e.g., text files, word processing documents, webpages or other web-based content, waveform audio files (WAV), motion picture experts group (MPEG) files, windows media video (WMV) files, joint photographic experts group (JPEG) files, graphics interchange format (GIF) files, portable network graphics (PNG) files, etc.), or as components of a single compressed file (e.g., a zip file).

In addition, various forms of content may be organized, categorized, and/or presented based on a channel or group of channels. A channel generally describes data or content available from a common source or having a common subject or theme. A channel may contain information in the form of audio clips, movie clips, TV clips, and music videos, as well as content such as blogs, social media pages, short original videos, pictures, photos, articles, avatars, software programs, games, etc.

The client machines 102A-102N may be personal computers (PC), laptops, mobile phones, tablet computers, or any other computing device. The client machines 102A-102N may run an operating system (OS) that manages hardware and software of the client machines 102A-102N. A browser (not shown) may run on the client machines (e.g., on the OS of the client machines). The browser may be a web browser that can access content served by a web server. The browser may provide textual, audio and graphical content using a web server and may allow editing of text, audio, video, and image content.

Server machine 110 may be a rackmount server, a router computer, a personal computer, a portable digital assistant, a mobile phone, a laptop computer, a tablet computer, a camera, a video camera, a netbook, a desktop computer, a media center, or any combination of the above.

Server machine 110 may include a web server 120 and a content referral system 130. In some embodiments, the web server 120 and content referral system 130 may run on one or more different machines. In an embodiment, content referral system 130 may run on a machine configured to serve content. Content referral system 130 also may run on a separate machine that communicates with one or more machines configured to provide content.

Web server 120 may serve text, audio, video and image content from data store 140 to clients 102A-102N. Clients 102A-102N may locate, access and consume various forms of content from web server 120 using a web browser. Web server 120 also may receive text, audio, video and image content from clients 102A-102N that is saved in data store 140 for purposes that may include preservation and distribution of content.

Web server 120 may receive queries for text, audio, video and image content and perform searches for various forms of content using data store 140 to locate data satisfying the search queries. Web server 120 may then send to a client 102A-102N content data results matching the search query.

In one embodiment, web server 120 provides an application configured to allow clients 102A-102N to upload, preview, edit, display, generate, publish, share and/or promote text, audio, video, and/or image content. Such functionality may include or utilize a content referral system 130. Such functionality also may be provided, for example, as one or more different web applications, standalone applications, systems, plugins, web browser extensions, and application programming interfaces (APIs).

In particular, some clients 102A-102N can include applications that are associated with a service provided by server 110. Examples of client machines that may use such applications ("apps") include mobile phones, "smart" televisions, tablet computers, and so forth. The applications or apps may access content provided by server 110, issue commands to server 110, receive content from server 110, and so on, without visiting web pages of server 110.

In general, functions described in one embodiment as being performed by server 110 or web server 120 can also be performed on the client machines 102A-102N in other embodiments if appropriate. In addition, the functionality attributed to a particular component can be performed by different or multiple components operating together. The server 110 also can be accessed as a service provided to other systems or devices through appropriate application programming interfaces, and thus is not limited to use in websites.

Content referral system 130 may generate attribution tags that allow a user to receive credit for referring content to other users on different systems and platforms. An attribution tag may be a unique identifier that is generated based on information about the user and the content. For example, an attribution tag may be a unique combination of at least a referring user identifier and a content identifier. An attribution tag also may include other information such as a timestamp, a sharing source, and/or a target destination for a referral. The attribution tag may be obfuscated by performing one or more of bitwise operations, hashing, and/or encryption to preserve integrity and prevent unauthorized use.

In one example, a generated attribution tag is provided to a social networking service 150 on behalf of a user. The generated attribution tag may be included as a parameter in a link, either of which may or may not be visible to any user. The social networking service 150 may use the link directly or indirectly (e.g., as part of a selectable preview) to allow its users to access the content. In an example, a link comprising an attribution tag is provided to an external social networking service 150 to allow content referral on an unrelated external platform 150.

A social networking service 150 generally describes any platform, system, software application and/or website that allows users to communicate with each other. For example, a social networking service 150 may be web-based in that it allows users to interact over the Internet (e.g., a social networking website, e-mail, messaging, newsgroups, posting of information on a website, teleconferencing, video conferencing, blogging, games, maps, file transfer, content/information sharing, virtual worlds, etc. In one example, a social networking service 150 may be an online community that allows users to share ideas, pictures, posts, videos, activities, events, and interests with other users. Users may be associated with other users based on common interests, groups, and/or connections.

Each user may have their own individual user account for accessing and utilizing a specific social networking service 150. Each user also may have their own different individual user accounts that are each specifically tied to a social networking service 150. In one example, a single individual user account may be used to access one or more different social networking services 150.

In one example, a generated attribution tag may be provided directly to a referring user in a link to the content. The referring user may freely distribute the link with the attribution tag to share the content with others. The referring user then may receive credit for each user who accesses the content associated with the attribution tag.

A user wishing to access shared content may, for example, select a link, preview or post that includes or refers to an attribution tag. The selection may generate a request to access content that includes the attribution tag. The request then may be received and the attribution tag may be detected in the request. The detected attribution tag then may be analyzed to determine a referral source (e.g., a referring user), the referred content, and other information about the referral. The requesting user then may be directed, redirected, and/or granted access to the content. In addition, a record of the referral may be stored so the referring user receives credit for their referral of the content.

In an embodiment, a group of users may be ranked based on a number of referrals. For example, users may be ranked based on a number of referrals provided for a specific piece of content, for referrals provided for content associated with one or more content channels, and/or for referrals provided for one or more content sources (e.g., website, a video sharing website, a photo sharing website, etc.). A top number or percentage of referring users may be determined based on a number of content referrals and/or the ranking. Top content referrers may receive enhanced privileges, such as special access to restricted content or early access to new content. A user also may be prompted to share content with others based on frequency and/or subject matter of the user's previous content referrals.

Figure 2:
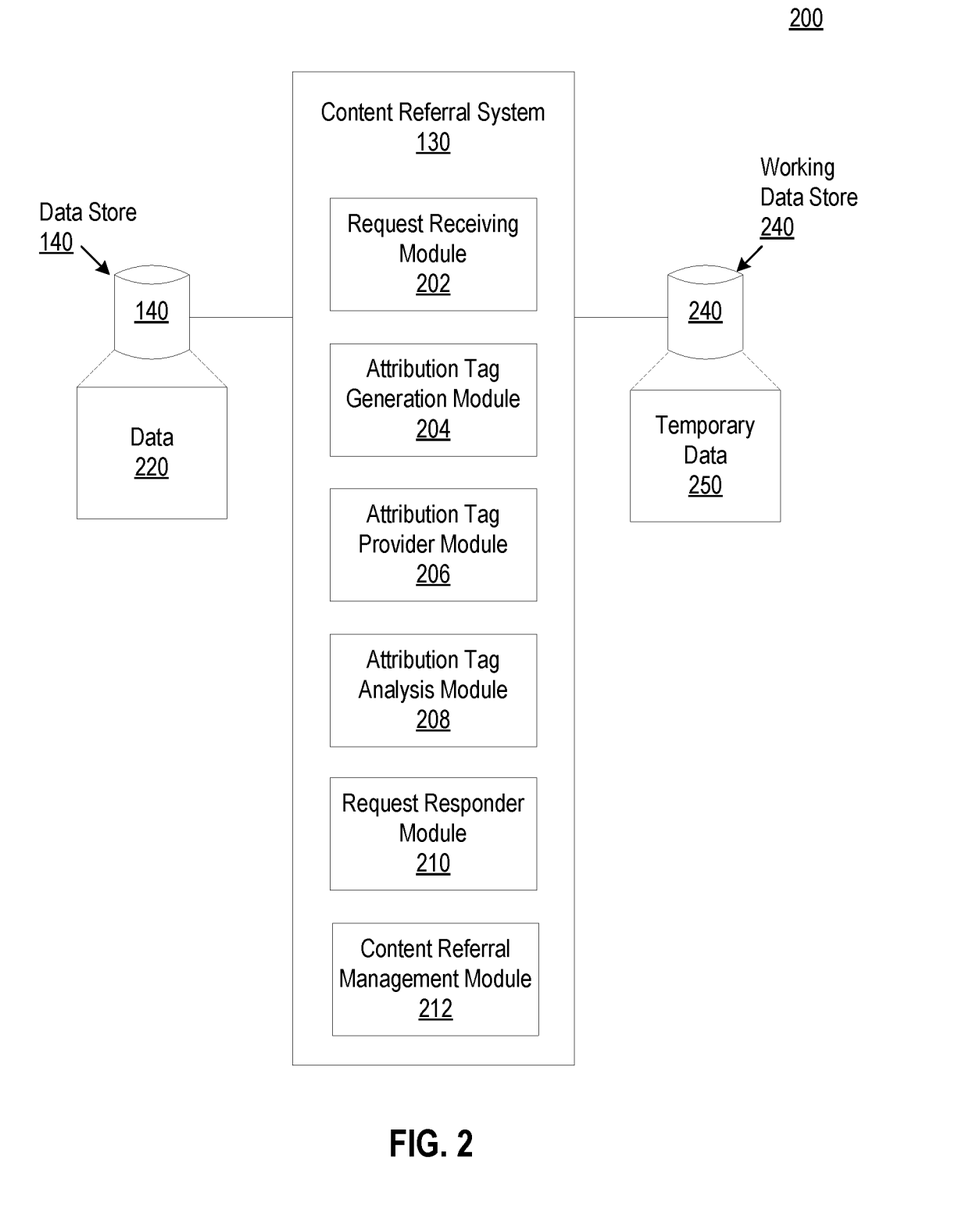
FIG. 2 is a block diagram of an online content referral system, in accordance with an embodiment.

FIG. 2 is a block diagram of a content referral system, in accordance with an embodiment. The content referral system 130 includes a request receiving module 202, attribution tag generation module 204, attribution tag provider module 206, attribution tag analysis module 208, request responder module 210 and content referral management module 212. In other embodiments, functionality associated with one or more of request receiving module 202, attribution tag generation module 204, attribution tag provider module 206, attribution tag analysis module 208, request responder module 210 and content referral management module 212 may be combined, divided and organized in various arrangements.

In an embodiment, content referral system 130 is coupled to data store 140 and working data store 240. Data store 140 includes data 220. Working data store 240 includes temporary data 250.

Data 220 may include various forms of textual, audio, video and/or image content maintained by a content hosting service. Data 220 also may include information about users of the content hosting service, content sources, content items, content referrals, methods of sharing content, and/or locations where content has been or may be shared.

In an embodiment, content referral system 130 utilizes working data store 240 as a temporary storage space. Working data store 240 may include temporary data 250 and results produced by content referral system 130. For example, content referral system 130 may use working data store 240 to store temporary data 250 that is needed to perform calculations and other functions.

In one example, content referral system 130 uses working data store 240 when generating attribution tags, analyzing attribution tags received in requests, and when ranking users based on a number of content referrals provided by each user. Working data store 240 may include, for example, any type or combination of volatile and non-volatile storage (e.g., disk, memory).

Request receiving module 202 receives requests to generate attribution tags that allow a user to receive credit for referring content to other users on various non-related systems. A user may request generation of an attribution tag or receive a generated attribution tag with the assistance of an application, such as an external website or a social networking service. A user or an application acting on behalf of the user may use the generated attribution tag when referring content to other users. For example, an attribution tag may be provided to one or more other users in a link to a content source.

Request receiving module 202 also receives requests from users seeking to access shared content. For example, a user may click on a website link, select a social networking service post or enter a URL to access shared content. In an example, a URL or other type of link may include an attribution tag that allows a referring user to receive credit for each user who views the content based on the referral.

Attribution tag generation module 204 generates attribution tags that associate a user with content the user has referred to others. A user may share content with friends, family, acquaintances and others via the content hosting service or an external system (e.g., social networking service) because the user finds the content informative, amusing, or interesting. The user may be motivated by recognition, praise, or popularity that can result from sharing the content. The user also may be incentivized to compete against other users for recognition and prizes. For example, users may compete in a contest or competition that rewards users providing the most content referrals.

In an embodiment, attribution tag generation module 204 creates attribution tags that allow a user to receive credit for referring content to others across non-related applications, systems and platforms. Examples of different applications, systems and platforms may include, but are not limited to, content sharing websites (e.g., video sharing, image sharing, etc.), social networking services (e.g., social networking websites, messaging, and feeds), message boards, text messages, instant messages, etc.

In one example, attribution tag generation module 204 generates an attribution tag by combining two or more fields. For example, a user identifier, a content identifier and a timestamp reflecting a time of referral may be combined or merged by concatenation or other methods. An XOR bitwise operation may be performed on the combined fields using an identifier of the content (e.g., a video ID) or another value. The resulting attribution tag is an obfuscated string of characters, which then may be encrypted. The generated attribution tag may be included as a parameter in visible or non-visible links providing access to referred content. The generated attribution tag also may be analyzed to determine details about the content referral that can be ascertained from the generated attribution tag.

Attribution tag provider module 206 provides attribution tags that have been generated to allow the sharing of content between users. For example, a user may request a link to allow the user to share a piece of content with others. In one example, attribution tag provider module 206 provides the link to the user, the link including an attribution tag associating the user with the content. The link may be provided to the user in an address bar or other location of a web browser or application (e.g., by default or based on a user preference). For example, the link and attribution tag both may be provided automatically when the user loads and/or views content in an application or web browser. In another example, a user also may share content by selecting a sharing option available on a watch page where the content is presented, on a social networking service (e.g., website or feed), or using a sharing service offered by any other website or application.

A user may copy, transfer and include a link having an attribution tag, for example, in emails, in instant messages, in text messages, on message boards, on websites, via a social networking services, etc. A user also may share the content by using an available sharing service to post a preview of the content for others to browse and select. For example, a user may use a sharing option provided by the content hosting service to share content across one or more platforms. The shared content may be published with a link and generated attribution tag that allows the user to receive credit for their referral of the content to other users.

Attribution tag analysis module 208 analyzes attribution tags that have been received. For example, an attribution tag may be received in a request for content from a user (e.g., a user of the content hosting service or an external system). Attribution tag analysis module 208 may detect the attribution tag in the request. Attribution tag analysis module 208 then may analyze the detected attribution tag to determine information about a content referral, which is stored as part of the attribution tag.

In an example, attribution tag analysis module 208 first may decrypt an encrypted attribution tag that is received. The decrypted attribution tag then may be further processed to extract information available within the attribution tag. In one example, an attribution tag may have been created by first concatenating a user identifier with a timestamp reflecting a time of creation and then by performing bitwise XOR on the combined fields using a content identifier, such as a video ID. Attribution tag analysis module 208 may deconstruct the previously described attribution tag by performing a bitwise XOR on the attribution tag using the same content identifier (e.g., video ID) and reading the concatenated fields accordingly.

Request responder module 210 receives incoming content requests from users. In an example, request responder module 210 receives content requests that include a source of content, such as a video or other content sharing website and an attribution tag associating a user with content that was referred to others by the user. Request responder module 210 also directs users to requested content.

Content referral management module 212 stores a record of a user's content referral. Content referral management module 212 also may rank a group of users based on the number of content referrals provided by each user. For example, a group of users may be ranked according to a number of content referrals each user has provided for a specific piece of content, for one or more content channels, or one and/or more sources of content. Further, content referral management module 212 may determine a top number or percentage of users providing content referrals for specific content, channels, and/or sources. Also, a user may be provided with recommendations to share content with others based on the user's historical content sharing tendencies such as content sharing frequency and/or subject matter associated with the user's previous content referrals.

Figure 3:
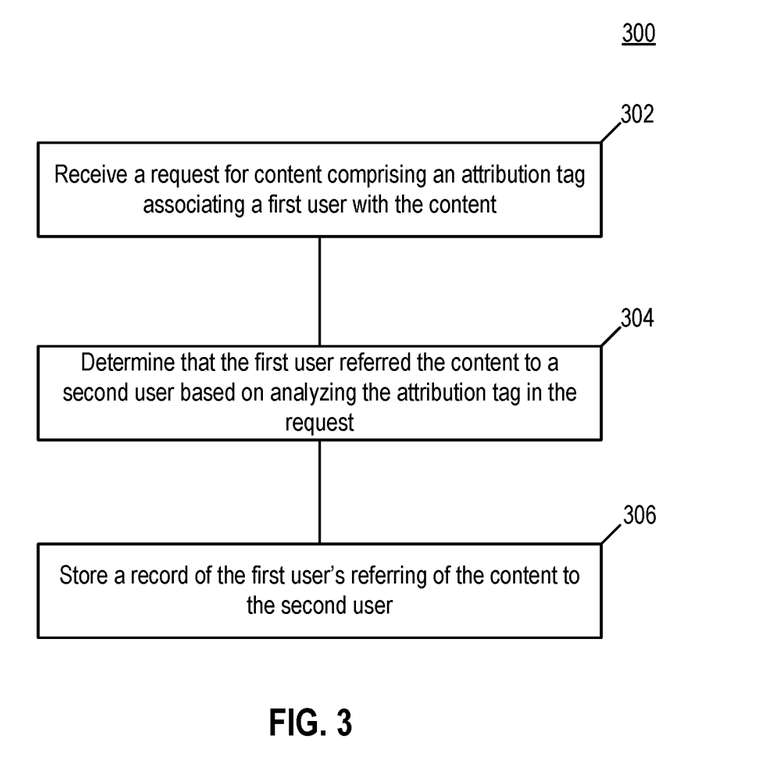
FIG. 3 is a flow diagram illustrating online content referral, according to an embodiment.

FIG. 3 is a flow diagram illustrating online content referral, according to an embodiment. The method 300 is performed by processing logic that may comprise hardware (circuitry, dedicated logic, etc.), software (such as is run on a general purpose computer system or a dedicated machine), or a combination of both. In one embodiment, the method 300 is performed by the server machine 110 of FIG. 1. The method 300 may be performed by content referral system 130 running on server machine 110 or one or more other computing devices.

Method 300 begins at stage 302, when a request for content comprising an attribution tag associating a first user with the content is received. The request may be received, for example, directly from a second user or on behalf of a second user seeking access to content.

In an embodiment, an attribution tag may be generated based on two or more fields associated with a referral of content. Fields pertaining to content referral may include, but are not limited to, user related fields, content related fields, and fields relating to a specific instance content referral.

In one example, a unique attribution tag is generated using a user identifier, a content identifier, a timestamp, and a destination identifier. A destination identifier may be a code, value or enumerated type that describes where the attribution tag will be provided to share content with others (e.g., a specific social networking website, a specific social networking feed, etc.).

In one embodiment, an attribution tag is a string 15 or more characters in length and is encoded in Base64. The attribution tag may be generated by combining multiple fields into a single string and then performing bitwise operations on the combined values. For example, a user identifier, a content source identifier, a content identifier, a timestamp, and a destination enum may be combined (e.g., concatenated) into a string of data. A bitwise XOR operation then may be performed on the string using a value, such as a content identifier (e.g., content ID, video ID, image ID, etc.), to obfuscate information in the attribution tag. The resulting attribution tag also may be encrypted.

A generated attribution tag may be included as a parameter in a link to associated content. The link may be distributed and used to provide access to the content. Use of the attribution tag ensures that the referral is valid and that the referring user receives credit for others who access the content based on the referral. Stage 302 may be performed by, for example, request receiving module 202.

At stage 304, a determination is made that the first user referred the content to a second user by analyzing the attribution tag in a request received from the second user. In an embodiment, a content request is received from a second user. The request includes an attribution tag, which is detected and analyzed.

In an example, an encrypted attribution tag is first decrypted. A bitwise XOR operation is performed on the decrypted attribution tag using a previously applied value (e.g., such as a content identifier). Information stored in the resulting string (e.g., user identifier, content source, content identifier, timestamp, destination identifier, and other values) may be determined, evaluated and used in further processing.

In one example, it is determined that a first user referred content to a second user when the user requesting the content differs from the referring user stored within the attribution tag. In an example, the requesting user is directed to the requested content after the authenticity of the attribution tag is confirmed by the analysis. Stage 304 may be performed by, for example, attribution tag analysis module 208.

At stage 306 a record of the first user's referring of the content to the second user is stored. For example, information about a content referral may be stored to allow the user to receive credit for the referral. In one example, users are ranked based on a number of content referrals. Individual users then may receive recognition and/or rewards for placing within, for example, the top 50%, 25%, 10%, or 1% of referrers in a particular category. Stage 306 may be performed by, for example, content referral management module 212.

Figure 4:
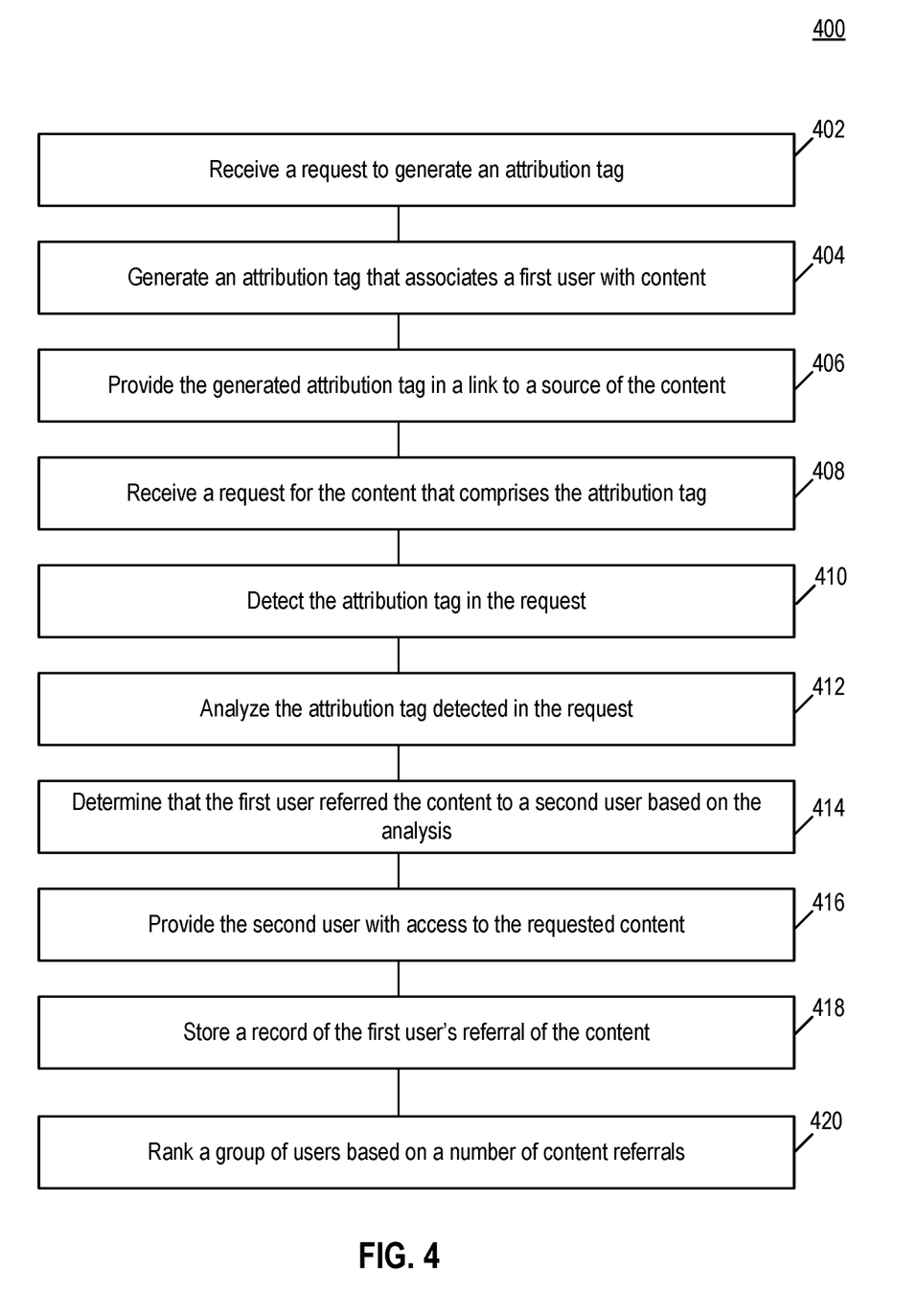
FIG. 4 is a flow diagram illustrating additional aspects of online content referral, according to an embodiment.

FIG. 4 is a flow diagram illustrating additional aspects of online content referral, according to an embodiment. The method 400 is performed by processing logic that may comprise hardware (circuitry, dedicated logic, etc.), software (such as is run on a general purpose computer system or a dedicated machine), or a combination of both. In one embodiment, the method 400 is performed by the server machine 110 of FIG. 1. The method 400 may be performed by content referral system 130 running on server machine 110 or one or more other computing devices.

Method 400 begins at stage 402, when a request to generate an attribution tag is received. Attribution tag requests may be initiated manually by a user or automatically on a user's behalf based on one or more user preferences and/or system settings.

In one embodiment, a user may request a content link that includes an attribution tag. The request may be performed using content sharing functionality provided by an application or webpage (e.g., a share button). For example, a share button on a website, such as a content sharing website, may be used to request a content link having a generated attribution tag. In one example, a video sharing website may include a share button that enables users to share video content to others via various social networking websites and feeds.

In other embodiments, requests to generate attribution tags may be initiated by automated processes. For example, a service may create a custom e-mail digest of content for a user, and may request generation of attribution tags to include in content links provided to the user. The service may use the attribution tags to determine which of the digest links have been accessed by the user, for example, when the user is not actively logged in to the service.

In an embodiment, an attribution tag generated by a first system is provided to a second system that manages user content referrals. For example, attribution tags may be generated by a first system (e.g., content uploading service, content referral service, etc.). The generated attribution tags may be provided to a second system (e.g., a content sharing service), which receives and uses the attribution tags to offer and manage user content referrals (e.g., on the content sharing service and/or across various external content and social networking services). Stage 402 may be performed by, for example, request receiving module 202.

At stage 404, an attribution tag that associates a first user with content is generated. In an embodiment, an attribution tag is generated by performing a bitwise XOR operation on a user identifier, of the user referring the content, using a content identifier. The content identifier and the attribution tag may both be included as separate encrypted parameters in a link providing access to the content. A timestamp and destination enumerator also may be combined with the user identifier prior to performing the bitwise XOR operation described above to provide a unique attribution tag for each destination where the link will be shared.

In one embodiment, an attribution tag may be a user vanity URL that allows a user to have a consistent attribution tag. Consistent attribution tags may be desirable to certain partners when sharing content on specific platforms or applications. In one example, a human-readable user vanity URL parameter is passed with an encrypted version of a content identifier as an additional parameter in a content link. Stage 404 may be performed by, for example, attribution tag generation module 204.

At stage 406, the generated attribution tag is provided in a link referring to a source of the content. In an example, a content sharing website passes a content link having an attribution tag directly to a social networking service. The link and the attribution tag then may be used by the social networking service to direct other users to the content. However, the link and attribution tag may never be presented or visible to any users. For example, content may be advertised with a title, description, and/or visual content while the link and its associated metadata are not visible to users. Stage 406 may be performed by, for example, attribution tag provider module 206.

At stage 408, a request for the content comprising the generated attribution tag is received. For example, a user may click on a website link, select a social networking service post or type in a URL to request access to content shared by another user. Stage 408 may be performed by, for example, request receiving module 202.

At stage 410, the attribution tag is detected in the received request. In an embodiment, the attribution tag may be detected based on a form of the attribution tag, a parameter name of the attribution tag, or a position of attribution tag data among a set of data. For example, the attribution tag may be detected in a URL requesting or providing access to a piece of content. Stage 410 may be performed by, for example, request receiving module 202.

At stage 412, the attribution tag detected in the request is analyzed. According to an embodiment, an attribution tag may be analyzed to determine information about a content referral. For example, the attribution tag may be processed to extract information such as the user who provided the content referral, the content that was referred, the date and time of the referral, a content source, where the referral was initiated, and the location or destination of the referral. Stage 412 may be performed by, for example, attribution tag analysis module 208.

At stage 414, a determination is made that the first user referred the content to a second user by analyzing an attribution tag. According to an embodiment, the user associated with the content request may be compared to the referring user in an attribution tag to determine whether content has been shared between users.

In one embodiment, a first user may access content using a first account and refer the content externally to others using a different account. A second user may observe the referred content on the external site using their own external account. Further, the second user then may access the referred content using another account (e.g., a video sharing website user account that belongs to the second user).

In one example, the first user may be provided with a suggestion to follow, friend or subscribe to an account of a user who has viewed their shared content. The second user also may receive a suggestion to follow, friend or subscribe to an account of a user who provided shared content that the second user has accessed. Stage 414 may be performed by, for example, attribution tag analysis module 208.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user.

In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

At stage 416, the second user is provided with access to the requested content. In one embodiment, the content may be transferred and displayed to the user. In an example, a user is directed to requested content even when attribution tag cannot be processed and/or verified. In such cases, the user is provided access, but a user may not receive referral credit. Stage 416 may be performed by, for example, request responder module 210.

At stage 418, a record of the first user's referral of the content is stored. According to an embodiment, information about the first user's content referral is stored to allow the user to receive referral credit. In one example, content referral information is aggregated for each user among a group of users to determine, recognize, and reward top content referrers. Stage 418 may be performed by, for example, content referral management module 212.

At stage 420, a group of users are ranked based on a number of content referrals each user has provided. In an embodiment, users may be ranked based on a number of content referrals provided for a piece of content, one or more content channels, and/or one or more content sources. Users may compete against one another for rewards and recognition associated with providing a certain amount of referrals based on a ranking and/or threshold.

In an example, a user having a certain content referral ranking, as compared to other users, may be rewarded with special access to content that otherwise may not be available and/or early access content that has not yet been released. Stage 420 may be performed by, for example, content referral management module 212.

Figure 5:
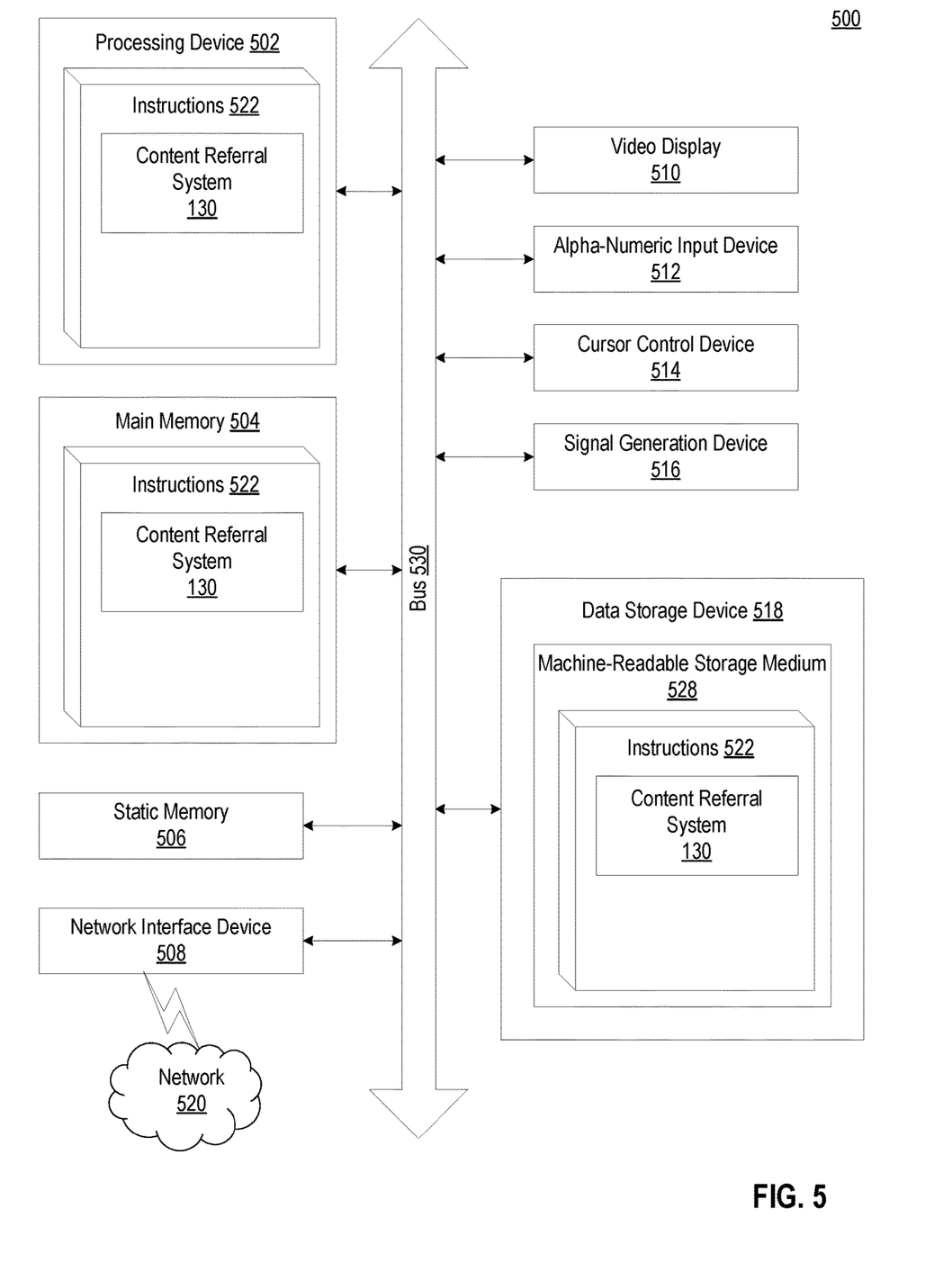
FIG. 5 is a block diagram of an exemplary computer system that may perform one or more of the operations described herein.

FIG. 5 illustrates a diagram of a machine in the exemplary form of a computer system 500 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device (processor) 502, a main memory 504 (e.g., read-only memory (ROM), flash memory, dynamic random access memory (DRAM) such as synchronous DRAM (SDRAM), double data rate (DDR SDRAM), or DRAM (RDRAM), etc.), a static memory 506 (e.g., flash memory, static random access memory (SRAM), etc.), and a data storage device 518, which communicate with each other via a bus 530.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 502 may also be one or more special-purpose processing devices such as an application specific integrated circuit (ASIC), a field programmable gate array (FPGA), a digital signal processor (DSP), network processor, or the like. The processor 502 is configured to execute instructions 522 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a computer-readable storage medium 528 on which is stored one or more sets of instructions 522 (e.g., software) embodying any one or more of the methodologies or functions described herein. The instructions 522 may also reside, completely or at least partially, within the main memory 504 and/or within the processor 502 during execution thereof by the computer system 500, the main memory 504 and the processor 502 also constituting computer-readable storage media. The instructions 522 may further be transmitted or received over a network 520 via the network interface device 508.

In one embodiment, the instructions 522 include instructions for a video trailer generation system (e.g., content referral system 130 of FIG. 1) and/or a software library containing methods that call a video trailer generation system. While the computer-readable storage medium 528 (machine-readable storage medium) is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "computing", "comparing", "applying", "creating", "ranking," "classifying," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Certain embodiments of the present disclosure also relate to an apparatus for performing the operations herein. This apparatus may be constructed for the intended purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A computer-implemented method, comprising:
receiving, using a processor of a content hosting platform, an identifier of a video hosted by the content hosting platform from an external platform, the video being requested by a first user of the external platform via the external platform, the first user having a first user account with the external platform;
determining, using the processor of the content hosting platform, that the video identifier comprises an attribution tag;
determining, using the processor of the content hosting platform, that the video was previously shared on the external platform with the first user in response to a share request submitted by a second user via the content hosting platform, wherein determining that the video was previously shared comprises analyzing the attribution tag that includes an association between the video and the second user to indicate that the video was previously shared by the second user, the second user having a second user account with the content hosting platform; and
storing, using the processor of the content hosting platform, a record of the second user's sharing of the video with the first user in a data store of the content hosting platform.

2. The method of claim 1, further comprising:
upon receiving the share request submitted by the second user, generating the attribution tag associating the second user with the video, wherein the attribution tag comprises an obfuscated combination of at least an identifier of the second user and an identifier of the video; and
providing the attribution tag to the external platform.

3. The method of claim 1, further comprising:
providing to the first user access to the video associated with the attribution tag.

4. The method of claim 2, wherein the generating comprises:
performing a bitwise operation to generate the obfuscated combination.

5. The method of claim 4, wherein the obfuscated combination further comprises at least one of a timestamp, a referral source or a referral destination.

6. The method of claim 2, further comprising:
encrypting the attribution tag.

7. The method of claim 1, further comprising:
ranking a group of users based on stored records of video sharings associated with users in the group.

8. The method of claim 1, further comprising:
determining, based on a threshold and stored records of video sharings associated with users, a top number of users providing video sharings.

9. The method of claim 1, further comprising:
providing the second user with a recommendation to share a second video based on stored records of video sharings associated with the second user.

10. The method of claim 7, further comprising:
providing the second user with access to content having restricted access based on the second user's ranking.

11. A system comprising:
a memory; and
a processor coupled with the memory to:
receive an identifier of a video hosted by a content hosting platform from an external platform, the video being requested by a first user of the external platform via the external platform, the first user having a first user account with the external platform;
determine that the video identifier comprises an attribution tag;
determine that the video was previously shared on the external platform with the first user in response to a share request submitted by a second user via the content hosting platform, wherein to determine that the video was previously shared, the processor is to analyze the attribution tag that includes an association between the video and the second user to indicate that the video was previously shared by the second user, the second user having a second user account with the content hosting platform; and store a record of the second user's sharing of the video with the first user in a data store of the content hosting platform.

12. The system of claim 11, wherein the processor is further to:

upon receiving the share request submitted by the second user, generate the attribution tag associating the second user with the video, wherein the attribution tag comprises an obfuscated combination of at least an identifier of the second user and an identifier of the video; and provide the attribution tag to the external platform.

13. The system of claim 11, wherein the processor is further to:

provide to the first user access to the video associated with the attribution tag.

14. The system of claim 12, wherein the processor is further to:

perform a bitwise operation to generate the obfuscated combination.

15. The system of claim 14, wherein the obfuscated combination further comprises at least one of a timestamp, a referral source or a referral destination.

16. The system of claim 11, wherein the processor is further to:

rank a group of users based on stored records of video sharings associated with users in the group.

17. The system of claim 11, wherein the processor is further to:

determine, based on a threshold and stored records of video sharings associated with users, a top number of users providing video sharings.

18. The system of claim 11, wherein the processor is further to:

provide the second user with a recommendation to share a second video based on stored records of video sharings associated with the second user.

19. The system of claim 16, wherein the processor is further to:

provide the second user with access to content having restricted access based on the second user's ranking.

20. A non-transitory computer readable medium having instructions stored thereon that, when executed by a processor, cause the processor to perform operations, comprising:

receiving an identifier of a video hosted by a content hosting platform from an external platform, the video being requested by a first user of the external platform via the external platform, the first user having a first user account with the external platform;

determining that the video identifier comprises an attribution tag;

determining that the video was previously shared on the external platform with the first user in response to a share request submitted by a second user via the content hosting platform, wherein determining that the video was previously shared comprises analyzing the attribution tag that includes an association between the video and the second user to indicate that the video was previously shared by the second user, the second user having a second user account with the content hosting platform; and storing a record of the second user's sharing of the video with the first user in a data store of the content hosting platform.

21. The non-transitory computer readable medium of claim 20, wherein the operations further comprise:

upon receiving the share request submitted by the second user, generating the attribution tag associating the second user with the video, wherein the attribution tag comprises an obfuscated combination of at least an identifier of the second user and an identifier of the video; and providing the attribution tag to the external platform.

22. The non-transitory computer readable medium of claim 21, wherein the generating comprises:

performing a bitwise operation to generate the obfuscated combination.

23. The non-transitory computer readable medium of claim 22, wherein the obfuscated combination further comprises at least one of a timestamp, a referral source or a referral destination.

* * * * *